United States Patent [19]
Wood

[11] 3,854,046

[45] Dec. 10, 1974

[54] SCANNING HEAD FOR INSPECTING MATERIAL HAVING PARALLEL STRANDS

[75] Inventor: Guy B. Wood, Waverly, Pa.

[73] Assignee: Weston Instruments, Inc., Newark, N.J.

[22] Filed: Apr. 11, 1973

[21] Appl. No.: 350,189

[52] U.S. Cl. ............................... 250/358, 250/360
[51] Int. Cl. ......................................... G01n 23/20
[58] Field of Search ........ 250/358, 359, 360, 219 S, 250/219 WE, 219 DF; 356/199, 200

[56] References Cited
UNITED STATES PATENTS

| | | | |
|---|---|---|---|
| 2,972,794 | 2/1961 | Saul | 250/219 WE |
| 3,132,253 | 5/1964 | Sorsen | 250/219 WE |
| 3,193,688 | 7/1965 | Morton | 250/219 WE |
| 3,614,432 | 10/1971 | Green | 350/360 |
| 3,652,864 | 3/1972 | Person | 250/219 FR |

Primary Examiner—James W. Lawrence
Assistant Examiner—D. C. Nelms
Attorney, Agent, or Firm—William R. Sherman; Walter C. Farley

[57] ABSTRACT

An improved scanning head for use in inspecting material in which strands or filaments exist. The material must have strands which are intended to be parallel to each other and equally spaced. The scanning head opening is selected to have a transverse dimension equal to an integral number of filaments plus an equal integral number of spaces between filaments in the direction of movement of the scanning head, which is generally transverse to the direction of strand movement. In another embodiment for use with material having parallel strands aligned with the direction of movement of the material being inspected and also parallel strands which extend at an angle to the direction of material movement, the aperture is selected to be a parallelogram having a direction of scan perpendicular to the direction of material movement and dimension in the direction of scan equal to an integral number of strands plus an equal integral number of spaces, and a dimension along the remaining sides of the parallelogram which is equal to the dimension of an integral number of transverse strands plus an equal number of spaces. In yet another embodiment for counting strands, as distinguished from determining parallelism, the scanning head has a dimension in the direction parallel to the strands which is relatively long compared with the largest strand or space dimension in the direction of scan, and a dimension in the direction of scan, which is perpendicular to the strand direction, which is less than the smaller one of strand width or space width.

4 Claims, 6 Drawing Figures

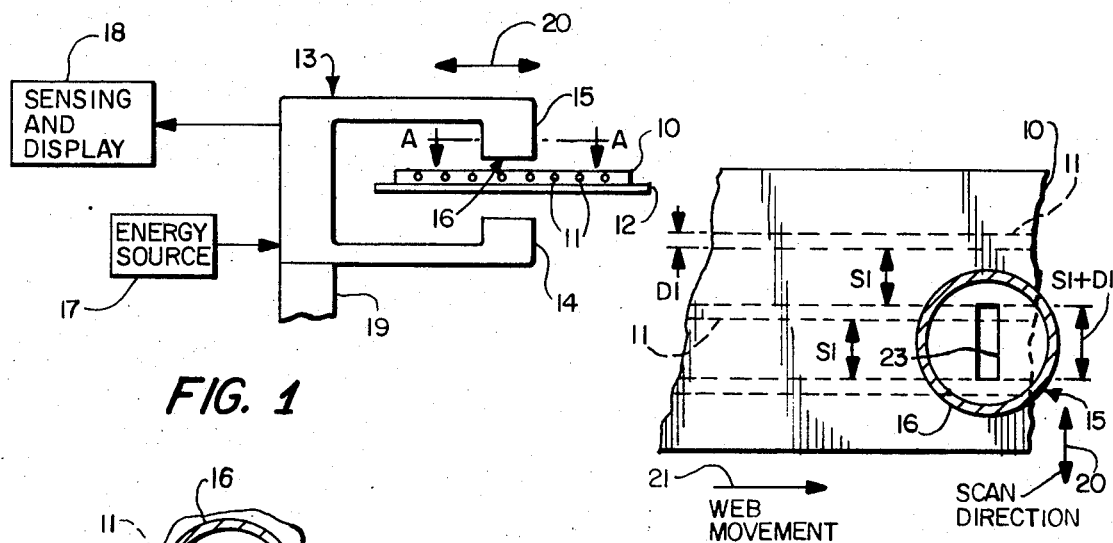
FIG. 1
FIG. 2
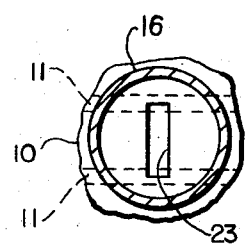
FIG. 3
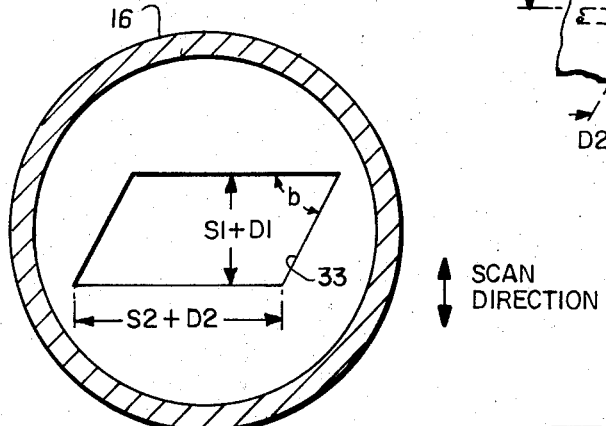
FIG. 4
FIG. 5
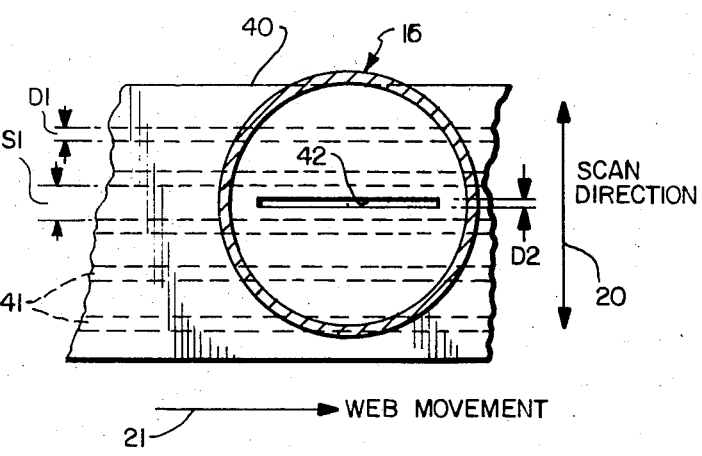
FIG. 6

SCANNING HEAD FOR INSPECTING MATERIAL HAVING PARALLEL STRANDS

This invention relates to quality control apparatus of the type used in determining deviations in spacing between plural parallel equally spaced strands in a web of material, and for counting such strands.

It has been well-known for many years to use X-radiation and optical radiation for the purpose of investigating the interior structure of webs of material or manufactured articles wherein strands or filaments of reinforcement are provided. Specifically, it is well-known to investigate the interior, otherwise invisible, of automobile type tires to examine the spacing, orientation and splicing of cords therein as disclosed in U.S. Pat. No. 3,550,443, Sherkin and U.S. Pat. No. 3,614,432, Green. Likewise, optical radiation has been employed as described in U.S. Pat. No. 3,274,391, Heinz for examining material which is transparent to light and which requires greater precision in the inspection process than can be accomplished by simple visual inspection.

It is an object of the present invention to provide an improved scanning head for receiving radiation passing through an article or web to be inspected, which scanning head improves the accuracy and simplifies the processing of the intelligence signals derived therefrom.

Broadly described, the scanning head incorporates an aperture for accepting the radiation, which aperture is carefully selected as to size and shape depending upon the material to be inspected. While specific dimensions do not form a part of this invention, the relationship between the dimension in, at least, the scanning direction and the dimensions of the strands and spaces therebetween in the material to be inspected is of utmost importance. In a material having parallel equally spaced strands, the aperture in the scanning head constitutes a rectangle having a dimension transverse to the strands, but parallel to the scanning direction, which is equal to an integral number of strands plus an integral number of spaces, the number of each being equal. Thus, the aperture might be equal to the total of one strand width and one space. The signal resulting from the exposure of this carefully selected aperture to the radiation passing through the material is then a substantially nonvarying signal unless there is a deviation from the desired equal spacing or parallelism in the strands. In that event, the signal deviates from the predetermined level and can be easily employed to give a warning signal or to correct the manufacturing step which has caused the error.

In the case of a material in which strands are also transversely provided, whether or not perpendicular, a rectangle or parallelogram having dimensions in both directions characteristic of strand size and spacing is provided, the same result being obtained.

For counting purposes, the aperture dimension in the scanning direction is made smaller than either the strand dimension or the spacing dimension in the scanning direction.

In order that the manner in which the foregoing and other objects are attained in accordance with the invention can be understood in detail, particularly advantageous embodiments thereof will be described with reference with the accompanying drawings, which form a part of this specification, and wherein:

FIG. 1 is a schematic diagram of an inspection system of the type in which the present invention is used;

FIG. 2 is a plan view, in partial section, of a segment of material having strands and a typical inspection head aperture positioned thereon;

FIG. 3 is a fragmentary portion of the device of FIG. 2 in a different position;

FIG. 4 is an illustration of a material having strands in two directions;

FIG. 5 is a plan view, in partial section, of an aperture usable with the material of FIG. 4; and FIG. 6 is an illustration of a strand counting aperture and the material usable therewith.

Referring now to FIG. 1, it will be seen that the apparatus involved in the present invention is for the purpose of examining a portion of material 10 which has strands or filaments such as those indicated at 11 embedded therein. The material 10 can be an elongated web of indeterminate length or it can be a segment of a partially manufactured article, such as a tire. In either case, some form of support or carrier is necessary which, if it is in the path of the radiation used for examining the same, is to be transparent thereto. Such a support is schematically indicated in FIG. 1 at 12.

The apparatus for examining the interior of the material 10 is very simply and schematically illustrated as a generally U-shaped member 13 having a lower portion 14 which includes a source of radiation such as an X-ray generator. Opposite the generator 14 is a radiation responsive device 15 which has a lower surface 16 facing the material and the source of radiation. An energy source 17 is connected to the radiation generator 14 to supply energy in a suitable form to produce the desired radiation. The radiation responsive portion of the device is connected to a sensing and display unit 18 which incorporates means responsive to the output of the radiation detector and displays information necessary to accomplish the desired inspection. In any event, devices 17 and 18 are conventional and need not be further described.

The entire unit 13 can be supported on a movable carrier 19 so that it is movable in a reciprocatory manner as indicated by the double headed arrow 20. Thus, the source and detector can scan across the material as it moves in a direction perpendicular to the radiation direction.

A portion of surface 16 and a portion of the upper surface of generator head 14 includes an aperture transparent to the radiation generated.

A specific embodiment of such an aperture is shown in FIGS. 2 and 3 wherein the material 10 containing strands 11 is assumed to be moving in the direction of arrow 21. While the aperture, as described in accordance with the present invention can be in either of the radiation generating or in the radiation receiving portions of the apparatus, it will be described herein as being in the radiation receiving head. Thus, the detector head is seen along section A—A of FIG. 1, in which view the end of head 15 including surface 16 and a rectangular aperture 23 is seen. A radiation responsive detector of an appropriate type is mounted upwardly of aperture 23 and is not shown in FIG. 2.

As shown in FIG. 2, the desired spacing between strands is indicated by the dimension D1, each spacing dimension and each strand dimension to be identical to each other such dimension so that the strands are parallel to each other. For this material there is chosen a head having an aperture 23 with a dimension in the scan direction equal to the sum (S1+D1) so that at any instant in time the radiation detector is exposed to incident radiation equal to that which passes through one space and one strand only. The specific position shown for the head 15 in FIG. 2 is selected to clearly illustrate this dimensional relationship. However, it will be seen from FIG. 3 that the radiation passing through the aperture will be the same in other positions.

Thus, when an end of aperture 23 reaches the mid-point of a strand, as in FIG. 3, the opposite end of the aperture is also at the mid-point of a strand so that the radiation through the aperture is still equal to that passing through one space and one strand. With this arrangement, the signal produced by the radiation detecting device will always be exactly the same if the detecting aperture is continually exposed to a material in which all strands are of equal size and density and wherein all strands are in a parallel, equally spaced relationship and the intervening material is homogeneous as to radiation transmissivity. Any deviation from these characteristics will result in a deviation which can easily be detected by appropriate sensing circuitry. A straightforward differential amplifier, for example, provided with means responsive to a deviation from the calibrated output can be used to perform the task. It will further be recognized that a multiple of the foregoing exposure relationship can be employed. This is particularly useful if the strands are very small and very closely spaced, or in similar conditions. Thus, one might select an aperture which has a length, in the scan direction, of five spacings plus five strand widths, i.e., 5(S1 + D1). It will be recognized that exactly the same relationship exists as to result.

FIGS. 4 and 5 illustrate an alternative embodiment for use with materials in which there are strands running in two different directions. As shown in FIG. 4, a material 30 having strands 31 which extend parallel to the direction of web movement and additional strands 32 which extend generally transversely to the direction of web movement can be examined by use of an aperture in the shape of a parallelogram. In such case, the acute angle (a) between strands 31 and 32 and the acute angle (b) in the parallelogram 33 of the aperture are made equal.

In particular, it will be seen that the spacing between strands 31 is equal to S1, the width of strands 31 is equal to D1, the spacing between strands 32 is equal to S2 and the width of each of strands 32 is equal to D2. In such case, the aperture to inspect this material is chosen in accordance with the dimensions shown enlarged in FIG. 5 in which the dimension in the direction of scan is equal to S1 + D1 and the dimension of each side in the direction of web movement is equal to S2 + D2. As before, the acute angle of the parallelogram of the aperture is equal to the angle between strands.

The operation of the aperture shown in FIGS. 4 and 5 is the same as, and based on the same principle as, that shown in FIGS. 2 and 3, the exposure to radiation being substantially constant for circumstances in which the spacing and strand size is constant and each material is homogeneously transparent to the radiation.

A different application of the concept of specific aperture size is illustrated in FIG. 6, this embodiment being for the purpose of counting strands rather than determining uniform distribution thereof. As shown in FIG. 6, the material 40 contains substantially parallel strands 41 which extend generally in the direction of web movement as shown by arrow 21. The spaces between strands are again indicated by the dimension S1 and the strand width by dimension D1. For the purpose of counting, an aperture 42 is provided, the aperture being relatively long in the direction of web movement but the dimension in the direction of scan being illustrated by D2, this dimension being smaller than either one of dimensions S1 or D1. Thus, the radiation received through aperture 42 when the aperture is adjacent a strand will be limited to that which can pass through the strand, there being none received through the surrounding carrier material. Likewise, when the aperture is adjacent a space only the radiation coming through the space will be seen. The magnitude of the change is, of course, a function of the difference in radiation transmissivity betwen the strand material and the sheet material. The interface will be represented by a relatively sharp change, the sharpness being a function of the width of aperture 42 in the direction of dimension D2, variations will therefore be relatively sharp and be rather easily detected. Circuitry including differentiating circuit means, as will be recognized by those skilled in the art, will be particularly helpful in sensing such variations.

While certain advantageous embodiments have been chosen to illustrate the invention, it will be understood by those skilled in the art that various changes and modifications can be made therein without departing from the scope of the invention as defined in the appended claims.

I claim:

1. In an apparatus for examining the arrangement of a plurality of strands in a body of material, the material being of type having a substantially homogeneous average transmissivity and the strands therein being of substantially constant width and spacing, the apparatus being of the type having a source of radiation to which the material is at least partially transparent, a radiation detector responsive to the radiation to produce a signal representative of the level of received rediation, means for supporting the source and the detector on opposite sides of a portion of the material and in alignment with each other so that radiation passing through the material is received by the detector, and means for producing relative motion between the source and detector assembly and the material so that various portions of the material can be examined, the improvement comprising means disposed between said source and said detector for limiting the area of exposure of the detector to radiation received from the source through the material, said means including means defining a radiation transparent aperture having a dimension in a direction transverse to the strands with is equal to the width of an integral number N of strands plus the width of the same integral number N of spaces between strands, the aperture being in the shape of a parallelogram with the sides defining said dimension being parallel to said strands.

2. An improved apparatus according to claim 1 wherein the material is of the type which additionally comprises a further plurality of transverse strands and the remaining sides of the aperture are parallel to said transverse strands, the angles between adjacent sides of said aperture being the same as the angles between crossing strands.

3. An improved apparatus according to claim 1 wherein said aperture is in the shape of a rectangle.

4. An improved apparatus according to claim 2, wherein the dimension of said aperture in a direction transverse to said further plurality of transverse strands is equal to an integral number of said transverse strands plus the width of the same integral number of spaces between said transverse strands.

* * * * *